(12) United States Patent
Uebayashi et al.

(10) Patent No.: US 7,224,676 B2
(45) Date of Patent: May 29, 2007

(54) MOBILE STATION, BASE STATION AND COMMUNICATION METHOD

(75) Inventors: Shinji Uebayashi, Yokohama (JP); Takanori Utano, Yokosuka (JP); Toshiyuki Futakata, Yokosuka (JP)

(73) Assignee: NTT DoCoMo Inc., Chiyoda-ku, Tokyo (JP)

(*) Notice: Subject to any disclaimer, the term of this patent is extended or adjusted under 35 U.S.C. 154(b) by 919 days.

(21) Appl. No.: 09/998,599

(22) Filed: Nov. 16, 2001

(65) Prior Publication Data

US 2002/0075817 A1    Jun. 20, 2002

(30) Foreign Application Priority Data

Nov. 17, 2000    (JP)    ............................. 2000-351886

(51) Int. Cl.
*H04Q 7/00*   (2006.01)
*H04B 7/216*  (2006.01)
*H04J 3/00*   (2006.01)
*H04J 1/00*   (2006.01)

(52) U.S. Cl. ...................... 370/330; 370/280; 370/281; 370/335

(58) Field of Classification Search ................ 370/280, 370/330
See application file for complete search history.

(56) References Cited

U.S. PATENT DOCUMENTS

| | | | | |
|---|---|---|---|---|
| 5,933,421 | A * | 8/1999 | Alamouti et al. ........... | 370/330 |
| 6,094,421 | A * | 7/2000 | Scott .......................... | 370/280 |
| 6,351,458 | B2 * | 2/2002 | Miya et al. .................. | 370/330 |
| 6,442,156 | B1 * | 8/2002 | Carlstrom ................... | 370/343 |
| 6,466,767 | B1 * | 10/2002 | Lidbrink et al. ......... | 455/67.11 |
| 6,515,970 | B1 * | 2/2003 | Lindsay et al. ............. | 370/280 |
| 6,560,209 | B1 * | 5/2003 | Alamouti et al. ........... | 370/330 |
| 6,611,507 | B1 * | 8/2003 | Hottinen et al. ............ | 370/331 |
| 6,745,049 | B1 * | 6/2004 | Uchida et al. .............. | 455/560 |
| 6,791,960 | B1 * | 9/2004 | Song .......................... | 370/335 |
| 6,791,963 | B1 * | 9/2004 | Hwang et al. .............. | 370/342 |
| 6,807,162 | B2 * | 10/2004 | Hayashi et al. ............. | 370/335 |
| 6,834,046 | B1 * | 12/2004 | Hosur et al. ................ | 370/335 |
| 6,839,333 | B1 * | 1/2005 | Åkerberg .................... | 370/330 |

(Continued)

FOREIGN PATENT DOCUMENTS

DE    198 30 841 A1    1/2000

(Continued)

OTHER PUBLICATIONS

Official Notice of Rejection Patent Application No.: 2000-351886 Case No.: DCMH120310.

(Continued)

*Primary Examiner*—Chirag G. Shah
(74) *Attorney, Agent, or Firm*—Workman Nydegger (57) ABSTRACT

A mobile station receives a signal based on a TDD method by receiving a signal based on a FDD method to acquire information of the signal based on the TDD method in a mobile communication system. For instance, the mobile station receives a signal based on a CDMA-FDD method. Then, the mobile station acquires information (e.g. information relating to a code, a frequency and a timing) of a signal based on a CDMA-TDD method from the signal based on the CDMA-FDD method. Then, the mobile station receives the signal based on the CDMA-TDD method on the basis of the acquired information.

25 Claims, 6 Drawing Sheets

U.S. PATENT DOCUMENTS

| | | | |
|---|---|---|---|
| 6,845,238 B1 * | 1/2005 | Muller | 455/436 |
| 6,882,727 B1 * | 4/2005 | Vialen et al. | 380/33 |
| 2001/0030956 A1 * | 10/2001 | Chillariga et al. | 370/348 |
| 2002/0049062 A1 * | 4/2002 | Petersen | 455/453 |

FOREIGN PATENT DOCUMENTS

| | | |
|---|---|---|
| EP | 0 975 184 A1 | 1/2000 |
| JP | 08-130766 | 5/1996 |
| JP | 08-265835 | 10/1996 |
| JP | 09-083429 | 3/1997 |
| JP | 09-261761 | 10/1997 |
| JP | 10-136429 | 5/1998 |
| JP | 2000-092541 | 3/2000 |
| JP | 2000-175244 | 6/2000 |
| JP | 2000-232394 | 8/2000 |
| JP | WO 00/51392 | 8/2000 |
| JP | 2002-135847 | 5/2002 |
| JP | 2002-159058 | 5/2002 |
| WO | WO00/42808 | 7/2000 |

OTHER PUBLICATIONS

Official Notice of Rejection; Case No.: DCMH120310, Patent Application No.: 2000-351886.

* cited by examiner

MOBILE STATION, BASE STATION AND COMMUNICATION METHOD

This application claims priority under 35 U.S.C. 119 to Patent Application No. 2000-351886 filed Nov. 17, 2000 in Japan, the content of which is incorporated hereinto by reference.

BACKGROUND OF THE INVENTION

1. Field of the Invention

The present invention relates to a mobile station, a base station and a communication method, and more particularly to a mobile station, a base station and a communication method designed so that the mobile station can receive a signal based on a TDD method (e.g. a CDMA-TDD method) by receiving a signal based on a FDD method (e.g. a CDMA-FDD method) to acquire information of the signal based on the TDD method in a mobile communication system.

2. Description of the Related Art

Until now there has not been any case that a plurality of radio interfaces are used in one system.

On the other hand, CDMA (Code Division Multiple Access) methods for use in mobile communication or the like include, for example, the CDMA-FDD (Frequency Division Duplex) method and the CDMA-TDD (Time Division Duplex) method, as discussed in the IMT-2000.

SUMMARY OF THE INVENTION

It is thus contemplated that both FDD and TDD methods may be used to provide services.

It is an object of the present invention to make it possible that in a mobile communication system, a mobile station receives a signal based on a TDD method by receiving a signal based on a FDD method to acquire information of the signal based on the TDD method.

In order to accomplish the above mentioned object, in the first aspect of the present invention, there is provided a communication method comprising: an FDD reception step for receiving a signal based on an FDD method; a first acquisition step for acquiring information of a signal based on a TDD method from the received signal based on the FDD method; and a first TDD reception step for receiving the signal based on the TDD method on the basis of the acquired information of the signal based on the TDD method.

Here, the first acquisition step may acquire information of a synchronization channel based on the TDD method from the received signal based on the FDD method, the first TDD reception step may receive the synchronization channel on the basis of the acquired information of the synchronization channel, and the communication method may further comprise: a second acquisition step for acquiring information of a code of a common control channel based on the TDD method from the received synchronization channel; an identification step for identifying the code of the common control channel on the basis of the acquired information of the code of the common control channel; a second TDD reception step for receiving the common control channel on the basis of the identified code of the common control channel; a third acquisition step for acquiring a code of a communication channel based on the TDD method from the received common control channel; and a third TDD reception step for receiving the communication channel on the basis of the acquired code of the communication channel.

Here, the information of the synchronization channel may include information relating to at least one of a code, a frequency and a timing of the synchronization channel.

Here, the information relating to the timing of the synchronization channel may include at least one of information relating to a position of a signal of the synchronization channel within a frame of the signal based on the TDD method and information relating to a timing offset between the signal based on the TDD method and the signal based on the FDD method.

Here, the first TDD reception step may make search for the synchronization channel with respect to each of codes which are possibly used for the synchronization channel to receive the synchronization channel.

Here, the first TDD reception step may make search for a signal of the synchronization channel by shifting position for the search within a frame of the signal based on the TDD method to receive the synchronization channel.

Here, the first acquisition step may acquire information of a common control channel based on the TDD method from the received signal based on the FDD method, the first TDD reception step may receive the common control channel on the basis of the acquired information of the common control channel, and the communication method may further comprise: a second acquisition step for acquiring a code of a communication channel based on the TDD method from the received common control channel; and a second TDD reception step for receiving the communication channel on the basis of the acquired code of the communication channel.

Here, the information of the common control channel may include information relating to at least one of a code, a frequency and a timing of the common control channel.

Here, the information relating to the timing of the common control channel may include at least one of information relating to a position of a signal of the common control channel within a frame of the signal based on the TDD method and information relating to a timing offset between the signal based on the TDD method and the signal based on the FDD method.

Here, the first TDD reception step may make search for a signal of the common control channel by shifting position for the search within a frame of the signal based on the TDD method to receive the common control channel.

Here, the first acquisition step may acquire information of a communication channel based on the TDD method from the received signal based on the FDD method, and the first TDD reception step may receive the communication channel on the basis of the acquired information of the communication channel.

Here, the information of the communication channel may include information relating to at least one of a code, a frequency and a timing of the communication channel.

Here, the information relating to the timing of the communication channel may include at least one of information relating to a position of a signal of the communication channel within a frame of the signal based on the TDD method and information relating to a timing offset between the signal based on the TDD method and the signal based on the FDD method.

Here, the TDD method may be a CDMA-TDD method and the FDD method may be a CDMA-FDD method.

In the second aspect of the present invention, there is provided a communication method comprising: a step for including information of a signal based on a TDD method in a signal based on an FDD method; and an FDD transmission step for transmitting the signal based on the FDD method.

Here, the information of the signal based on the TDD method may include information of a synchronization channel based on the TDD method.

Here, the information of the synchronization channel may include information relating to at least one of a code, a frequency and a timing of the synchronization channel.

Here, the information of the signal based on the TDD method may include information of a common control channel based on the TDD method.

Here, the information of the common control channel may include information relating to at least one of a code, a frequency and a timing of the common control channel.

Here, the information of the signal based on the TDD method may include information of a communication channel based on the TDD method.

Here, the information of the communication channel may include information relating to at least one of a code, a frequency and a timing of the communication channel.

Here, the communication method may further comprise a TDD transmission step for transmitting the signal based on the TDD method, and the signal based on the TDD method may be a signal which includes a signal of a communication channel but does not include a signal of a synchronization channel and a signal of a common control channel.

Here, the communication method may further comprise a TDD transmission step for transmitting the signal based on the TDD method, and the signal based on the TDD method may include a signal of a communication channel and both or one of a signal of a synchronization channel and a signal of a common control channel.

Here, the TDD method may be a CDMA-TDD method and the FDD method may be a CDMA-FDD method.

In the third aspect of the present invention, there is provided a communication method comprising: a step for including, at a base station, information of a signal based on a TDD method in a signal based on an FDD method; a step for transmitting the signal based on the FDD method from the base station to a mobile station; a step for acquiring the information of the signal based on the TDD method from the received signal based on the FDD method; and a step for receiving the signal based on the TDD method on the basis of the acquired information of the signal based on the TDD method.

In the fourth aspect of the present invention, there is provided a mobile station comprising: FDD reception means for receiving a signal based on an FDD method; acquisition means for acquiring information of a signal based on a TDD method from the received signal based on the FDD method; and TDD reception means for receiving the signal based on the TDD method on the basis of the acquired information of the signal based on the TDD method.

In the fifth aspect of the present invention, there is provided a base station comprising: means for including information of a signal based on a TDD method in a signal based on an FDD method; and FDD transmission means for transmitting the signal based on the FDD method.

With this configuration, in a mobile communication system, a mobile station can receive a signal based on a TDD method by receiving a signal based on a FDD method to acquire information of the signal based on the TDD method.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below with reference to the drawings.

Figure 1:
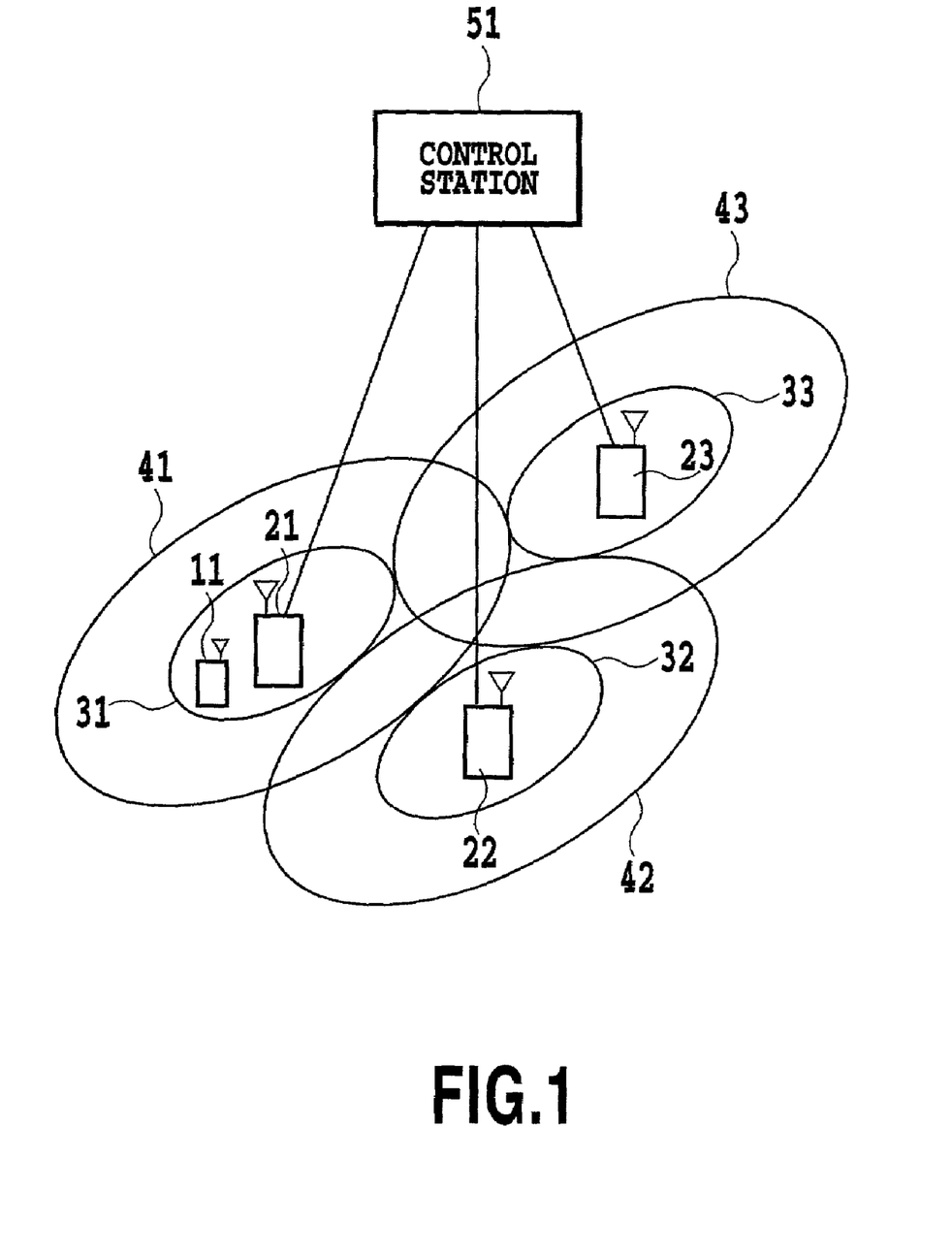
FIG. 1 is a diagram showing an example of a mobile communication system.

FIG. 1 is a diagram showing an example of a mobile communication system. In the example shown in FIG. 1, each base station provides the same service using both a CDMA-FDD method and a CDMA-TDD method.

Figure 2:
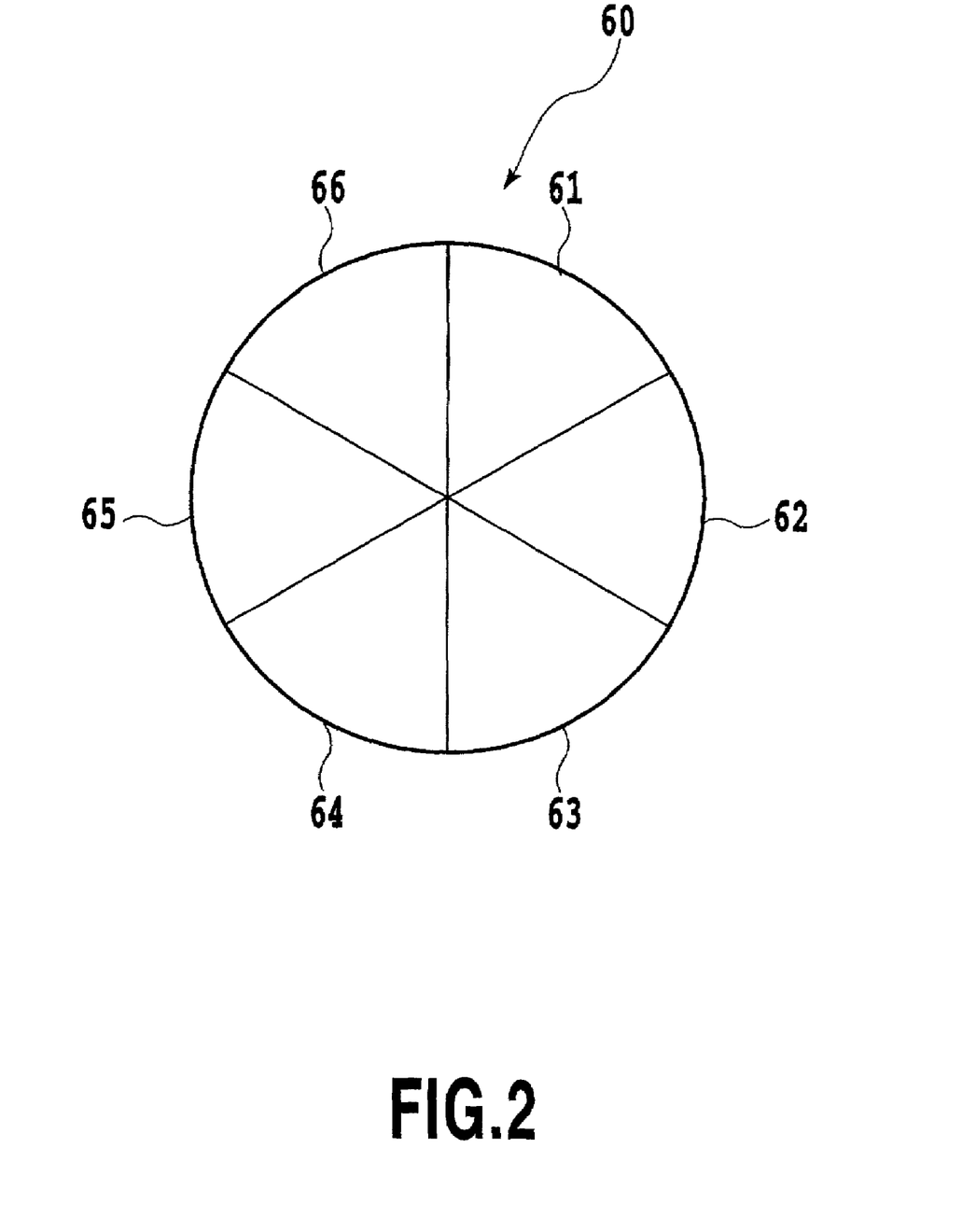
FIG. 2 is a diagram showing an example in which one cell is divided into six cells.

Further, in the example in FIG. 1, each base station has a service area (cell) based on the CDMA-FDD method and a service area (cell) based on the CDMA-TDD method. However, for example, the cell may be divided into a plurality of sectors so that one base station has a plurality of service areas (sectors) for each of the methods. In the example shown in FIG. 2, a cell 60 is divided into six sectors 61–66.

In the example in FIG. 1, a base station 21 has a service area 31 based on the CDMA-TDD method and a service area 41 based on the CDMA-FDD method. Further, the base station 22 has a service area 32 based on the CDMA-TDD method and a service area 42 based on the CMDA-FDD method. The base station 23 has a service area 33 based on the CDMA-TDD method and a service area 43 based on the CMDA-FDD method. If, for example, a mobile station 11 is located both in the service area 31 based on the CDMA-TDD method and in the service area 41 based on the CDMA-FDD method, then it can make radio communication with the base station 21 based on either the CDMA-TDD method or the CDMA-FDD method.

A control station 51 controls each base station and manages channels used for the radio communication between a mobile station and a base station. That is, the control station 51 determines and manages the current states of the channels (channels used in each service area, vacant channels, etc.). If the control station receives a request for channel assignment, it assigns a channel taking the current states of the channels into consideration. The request for channel assignment is issued when a call is made in a service area, when a handover call is transferred to a service area from another service area, or in other cases.

Concerning the size (extent) of a service area, when the transmission power for the CDMA-TDD method is set almost equal to that for the CDMA-FDD method, the service area based on the CDMA-FDD method is generally larger than that of the service area based on the CDMA-TDD method as shown in FIG. 1, since the transmission time is divided into slots in the case of the CDMA-TDD method. However, there happens that the service area of the FDD method is almost the same as that of the TDD method or that the service area of the TDD method becomes larger than that of the FDD method, when the service area of the CDMA-FDD method is intentionally reduced in the metropolitan area or the like.

By the way, a frequency range and a carrier position of the CDMA-TDD method vary depending on country, region, operator, environmental condition (installation status of other systems such as fixed micro). Thus, it can occur that roaming cannot be made by the CDMA-TDD method.

Thus, it can be considered to make roaming by the CDMA-FDD method and then shift to the CDMA-TDD method. In other words, it can be considered that a mobile station receives a signal based on the CDMA-TDD method by receiving a signal based on the CDMA-FDD method to acquire information of the signal based on the CDMA-TDD method.

Figure 3:
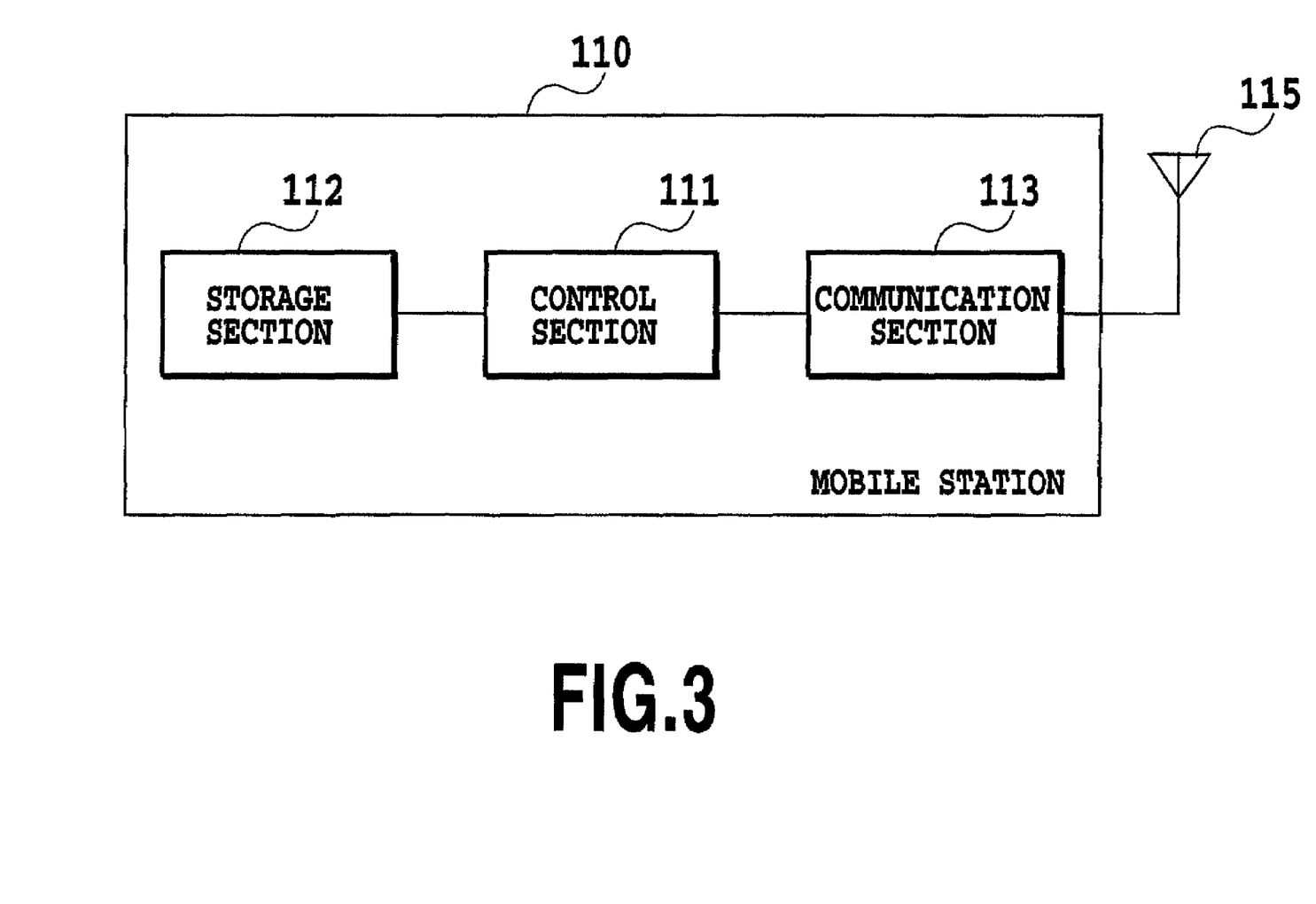
FIG. 3 is a block diagram showing an example of a configuration of a mobile station.

FIG. 3 is a block diagram showing an example of a configuration of a mobile station. A mobile station 110, shown in FIG. 3 comprises a control section 111, a storage section 112, a communication section 113 and an antenna 115. The control section 111 provides various types of control. The control section 111 is capable of making both a communication based on the CDMA-FDD method and a communication based on the CDMA-TDD method with the base station through the communication section 113 and the antenna 115. In making the communication, the control section 111 controls the communication section 113 with respect to a code, a frequency, a timing or the like of a signal. The storage section 112 stores various kinds of information.

Figure 4:
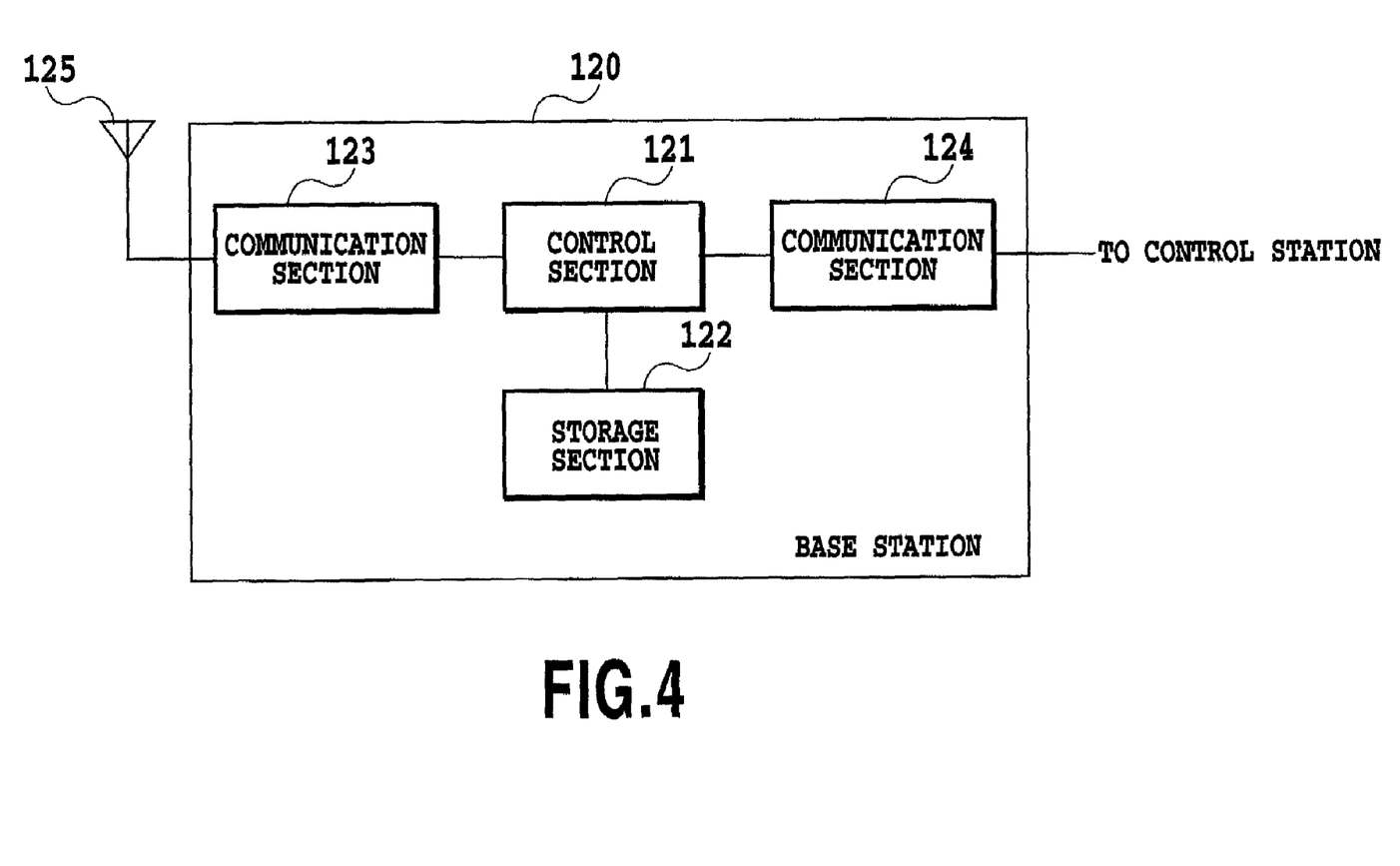
FIG. 4 is a block diagram showing an example of a configuration of a base station.

FIG. 4 is a block diagram showing an example of a configuration of a base station. A base station 120, shown in FIG. 4 comprises a control section 121, a storage section 122, communication sections 123 and 124 and an antenna 125. The control section 121 provides various types of control. The control section 121 is capable of making both a communication based on the CDMA-FDD method and a communication based on the CDMA-TDD method with a mobile station through the communication section 123 and the antenna 125. Further, the control section 121 is capable of making a communication with a control station through the communication section 124. The storage section 122 stores various kinds of information.

The base station always transmits a signal based on the CDMA-TDD method including a signal of a forward (link) common channel.

Figure 5:
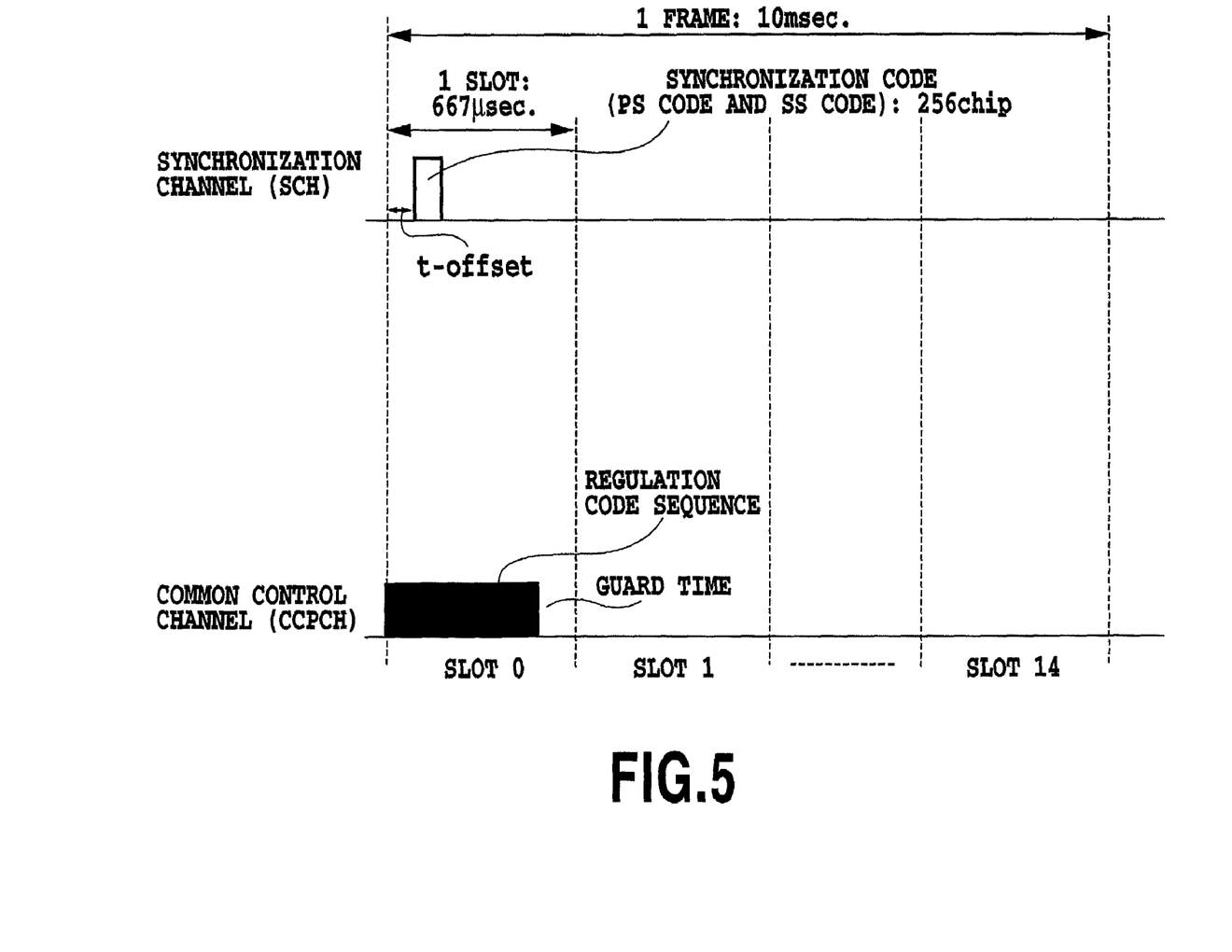
FIG. 5 is a diagram showing an example of a forward common channel based on a CDMA-TDD method transmitted by a base station.

FIG. 5 is a diagram showing an example of a forward common channel based on a CDMA-TDD method transmitted by a base station. In this embodiment, the base station transmits a synchronization channel (SCH) and a common control physical channel (CCPCH) as the forward common channel based on the CDMA-TDD method. A mobile station can receive this forward common channel for synchronization with a forward signal and identify the spreading code. The SCH is transmitted only during a period of 256 chip. An offset (t-offset) is added to a transmission timing to distinguish adjacent cells.

The SCH transmits a primary synchronization code (PS code) which is common to all the service areas and a secondary synchronization code (SS code). The PS code and the SS code are codes of 256 chip. A mobile station can receive the PS code to establish slot synchronization and can detect the SS code to establish frame synchronization and to determine an S code group to which a S code (Scrambling Code) used in the service area at which the mobile station receives the signal belongs.

The mobile station identifies the S code of the service area by using CCPCH. The mobile station can identify the kind of the S code, since all the service areas use the same C code (Channelization Code) for the CCPCH. The CCPCH is used for transmitting information concerning the system and the service area.

The CCPCH includes P-CCPCH and S-CCPCH. The P-CCPCH is used for transmitting information concerning the service area. The S-CCPCH is used for transmitting information concerning an incoming call or the like to a mobile station.

Both the P-CCPCH and the S-CCPCH are spread by spreading codes (S code and C code in the case of the present embodiment).

Figure 6:
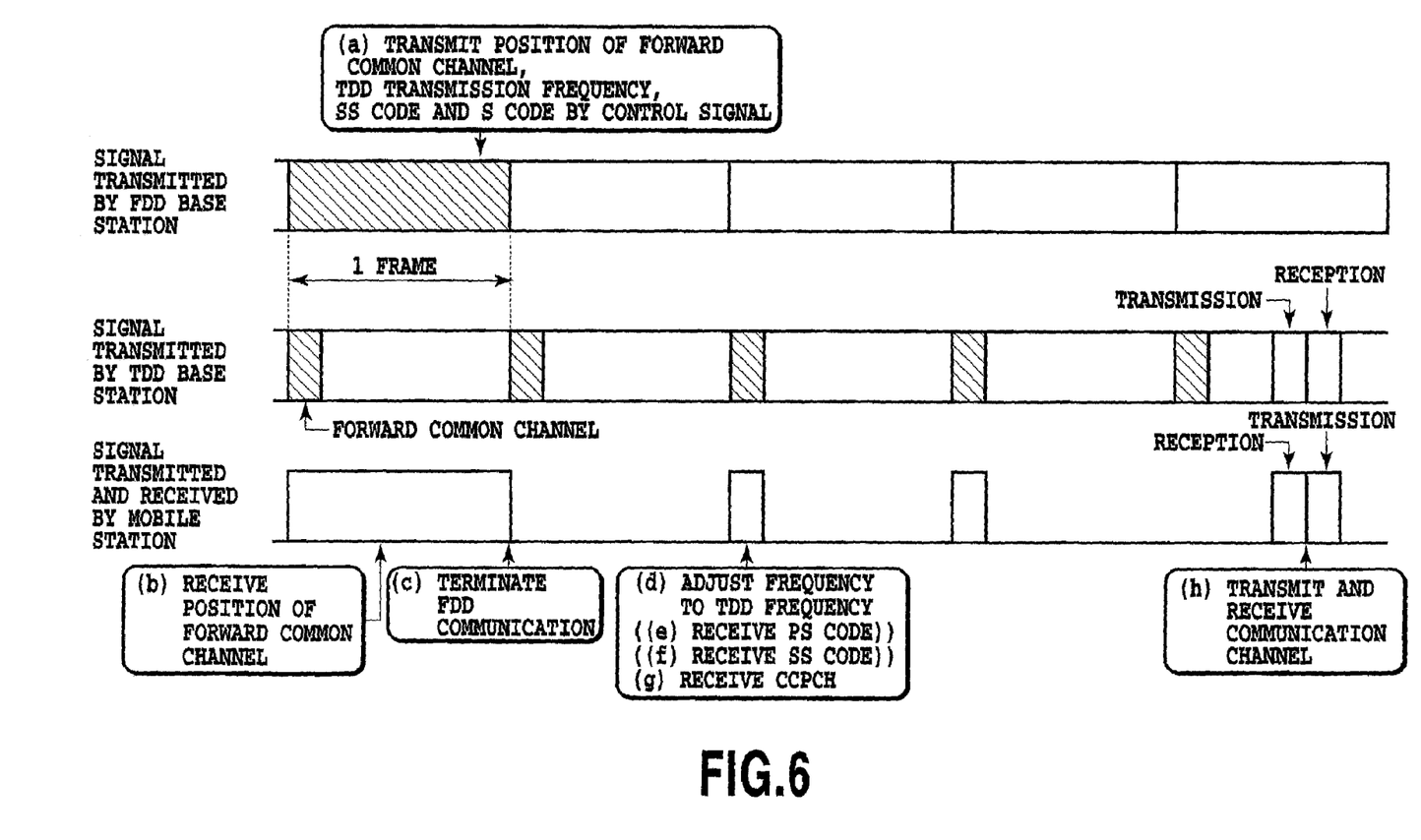
FIG. 6 is a diagram showing an example of interaction between a base station and a mobile station for switching from a communication based on a CDMA-FDD method to a communication based on a CDMA-TDD method.

FIG. 6 is a diagram showing an example of interaction between a base station and a mobile station for switching from a communication based on a CDMA-FDD method to a communication based on a CDMA-TDD method. The mobile station performs, for example, the processing as is described below when power source is turned on.

First, the mobile station receives a signal based on the CDMA-FDD method from the base station. The base station transmits a position of a forward common channel, a transmission frequency of a signal based on the CDMA-TDD method, SS code and S code by using a control signal (FIG. 6(a)). These kinds of information, however, need not be transmitted when the mobile station already knows them.

The mobile station, upon receipt of the position of the forward common channel, frequency, etc. ((b)), terminates a communication based on the CDMA-FDD method ((c)). Then, the mobile station adjusts the reception frequency to the frequency of the signal based on the CDMA-TDD method on the basis of the acquired frequency ((d)). Then, the mobile station makes synchronization with CCPCH (based on the CDMA-TDD method) by using the acquired S code at the acquired position of the forward common channel to receive the CCPCH ((g)).

In the example of FIG. 6, the signal based on the CDMA-FDD method and the signal based on the CDMA-TDD method transmitted by the base station have been synchronized with regard to the timings. When the synchronization of the timings has not been made, however, the timing offset for both the signals can be transmitted to the mobile station from the base station to thereby let the mobile station receive the CCPCH to make frame synchronization of the signal based on the CDMA-TDD method.

Further, even when the mobile station cannot be given any command for the (transmission) frequency of the CCPCH from the base station, the mobile station is capable of adjusting the frequency to the CCPCH by searching (the frequency of) the CCPCH from among different frequencies.

Further, even when the mobile station is unable to receive the command for the position or the like of the forward common channel from the base station though the frame length of the signal based on the CDMA-TDD method is known, it is possible to receive the CCPCH by searching the CCPCH within the frame of the signal based on the CDMA-TDD method. The search is made by shifting the position for search within the frame.

When the CCPCH cannot be received by the S code transmitted by the base station, the SS code (synchronizing signal) transmitted by the base station is received ((f)). As discussed above, in the present embodiment, the base station transmits the PS code and the SS code as the synchronization signals. The mobile station can establish slot synchronization by receiving the PS code. Further, the SS code and the S code are designed so that the candidates of the S code is defined when the SS code is defined. Thus, since S codes possibly used for spreading the CCPCH can be limited when the SS code is received, the mobile station can specify the S code by trying to receive the CCPCH by using each of the limited S codes ((g)).

When the CCPCH cannot be received by the S code specified by the base station, it is possible to start with reception of the PS code rather than reception of the SS code specified by the base station.

Further, even when the specifications for the SS code and the S code from the base station cannot be received, the mobile station can receive the CCPCH. In the present embodiment, only one kind of PS code is used, and the mobile station knows this PS code. Thus, if the mobile station can receive the PS code ((e)), the mobile can know a transmission timing of the SS code and therefore the mobile can try reception with respect to all the SS codes ((f)). When the SS code can be received, S codes are limited, so that reception of the CCPCH should be tried by using each of the limited S codes ((g)).

The base station can be designed so as to be able to transmit information of timing (position within frame, timing offset or the like) and frequency of the PS code and the SS code to the mobile station.

Even when the mobile station is unable to receive the command for the position or the like of the PS code and the SS code from the base station though the frame length of the signal based on the CDMA-TDD method is known, it is possible to receive the PS code and the SS code by searching the PS code and the SS code within the frame of the signal based on the CDMA-TDD method. The search is made by shifting the position for search within the frame.

The mobile station, upon reception of P-CCPCH and subsequent reception of S-CCPCH, is informed of presence of an incoming call to the mobile station and receives specifications for transmission and reception slots and C code to make transmission and reception by using a communication channel in accordance with the specifications ((h)). Further, in the present embodiment, the communication channel is spread by a spreading code (In the case of the present embodiment, S code, and C code varying depending on service area).

The mobile station can be informed of presence of an incoming call to the mobile station while receiving the signal based on the CDMA-FDD method. For instance, the mobile station, after receiving paging by S-CCPCH based on the CDMA-FDD method, receives designation of a communication channel (designation of transmission and reception slots, C code or the like) based on the CDMA-TDD method by FACH (Forward Access Channel: a kind of a forward common channel) based on the CDMA-FDD method thereby to make transmission and reception by using the communication channel based on the CDMA-TDD method.

Further, it is also possible for the mobile station to make transmission while receiving the signal based on the CDMA-FDD method. For instance, the mobile station is capable of making a request for connection by means of RACH (Random Access Channel: a kind of a reverse common channel) based on the CDMA-FDD method to obtain designation of a communication channel based on the CDMA-TDD method by the FACH based on the CDMA-FDD method thereby to make transmission and reception by using the communication channel based on the CDMA-TDD method.

In the present embodiment, a base station transmits a signal of a forward common channel (a signal (PS code and SS code) of a synchronization channel, and a signal of a common control channel (P-CCPCH and S-CCPCH)), and a signal of a communication channel as a signal based on a CDMA-TDD method. However, for example, with respect to the signal of the synchronization channel, the base station may choose not to transmit either the SS code or any signal for the synchronization channel. Further, for example, with respect to the signal of the common control channel, the base station may choose not to transmit either the signal of the P-CCPCH or the signal of S-CCPCH or not to transmit these signals at all.

When a base station does not transmit a forward common channel, a mobile station receives a signal of a communication channel from the beginning. In such a case, the base station can be set for transmitting to a mobile station, information of a code (S code and C code), a timing (positions of slots for transmission and reception, timing offset or the like) and a frequency of the communication channel.

What is discussed above is concerned with the cases where the CDMA-FDD method and the CDMA-TDD method are applied, but the present invention is also applicable to the cases where other FDD method and TDD method are employed.

As discussed above, according to the present invention, in a mobile communication system, a mobile station can receive a signal based on a TDD method by receiving a signal based on a FDD method to acquire information of the signal based on the TDD method.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A communication method comprising:
   an FDD reception step for receiving a signal based on an FDD method;
   a first acquisition step for acquiring information of a signal based on a TDD method from the received signal based on the FDD method; and
   a first TDD reception step for receiving the signal based on the TDD method on the basis of the acquired information of the signal based on the TDD method, wherein
   the first acquisition step acquires information of a synchronization channel based on the TDD method from the received signal based on the FDD method,
   the first TDD reception step receives the synchronization channel on the basis of the acquired information of the synchronization channel, and
   the communication method further comprises:
      a second acquisition step for acquiring information of a code of a common control channel based on the TDD method from the received synchronization channel;
      an identification step for identifying the code of the common control channel on the basis of the acquired information of the code of the common control channel;
      a second TDD reception step for receiving the common control channel on the basis of the identified code of the common control channel;

a third acquisition step for acquiring a code of a communication channel based on the TDD method from the received common control channel; and a third TDD reception step for receiving the communication channel on the basis of the acquired code of the communication channel.

2. The communication method as claimed in claim 1, wherein the information of the synchronization channel includes information relating to at least one of a code, a frequency and a timing of the synchronization channel.

3. The communication method as claimed in claim 2, wherein the information relating to the timing of the synchronization channel includes at least one of information relating to a position of a signal of the synchronization channel within a frame of the signal based on the TDD method and information relating to a timing offset between the signal based on the TDD method and the signal based on the FDD method.

4. The communication method as claimed in claim 1, wherein the first TDD reception step makes search for the synchronization channel with respect to each of codes which are possibly used for the synchronization channel to receive the synchronization channel.

5. The communication method as claimed in claim 1, wherein the first TDD reception step makes search for a signal of the synchronization channel by shifting position for the search within a frame of the signal based on the TDD method to receive the synchronization channel.

6. A communication method comprising:
an FDD reception step for receiving a signal based on an FDD method;
a first acquisition step for acquiring information of a signal based on a TDD method from the received signal based on the FDD method; and
a first TDD reception step for receiving the signal based on the TDD method on the basis of the acquired information of the signal based on the TDD method, wherein
the first acquisition step acquires information of a common control channel based on the TDD method from the received signal based on the FDD method,
the first TDD reception step receives the common control channel on the basis of the acquired information of the common control channel, and
the communication method further comprises:
a second acquisition step for acquiring a code of a communication channel based on the TDD method from the received common control channel; and
a second TDD reception step for receiving the communication channel on the basis of the acquired code of the communication channel.

7. The communication method as claimed in claim 6, wherein the information of the common control channel includes information relating to at least one of a code, a frequency and a timing of the common control channel.

8. The communication method as claimed in claim 7, wherein the information relating to the timing of the common control channel includes at least one of information relating to a position of a signal of the common control channel within a frame of the signal based on the TDD method and information relating to a timing offset between the signal based on the TDD method and the signal based on the FDD method.

9. The communication method as claimed in claim 6, wherein the first TDD reception step makes search for a signal of the common control channel by shifting position for the search within a frame of the signal based on the TDD method to receive the common control channel.

10. A communication method comprising:
an FDD reception step for receiving a signal based on an FDD method;
a first acquisition step for acquiring information of a signal based on a TDD method from the received signal based on the FDD method; and
a first TDD reception step for receiving the signal based on the TDD method on the basis of the acquired information of the signal based on the TDD method, wherein
the first acquisition step acquires information of a communication channel based on the TDD method from the received signal based on the FDD method,
the first TDD reception step receives the communication channel on the basis of the acquired information of the communication channel, and
the information of the communication channel includes at least one of information relating to a position of a signal of the communication channel within a frame of the signal based on the TDD method and information relating to a timing offset between the signal based on the TDD method and the signal based on the FDD method.

11. A communication method comprising:
an FDD transmission step for transmitting a signal based on an FDD method, with information of a signal based on a TDD method being included in the signal based on the FDD method; and
a TDD transmission step for transmitting the signal based on the TDD method,
wherein the signal based on the TDD method includes a signal of a synchronization channel, a signal of a common control channel and a signal of a communication channel,
the information of the signal based on the TDD method includes information of the synchronization channel,
the signal of the synchronization channel is a signal for identifying a code of the common control channel, and
the signal of the common control channel includes information of the communication channel.

12. The communication method as claimed in claim 11, wherein the information of the synchronization channel includes information relating to at least one of a code, a frequency and a timing of the synchronization channel.

13. A communication method comprising:
an FDD transmission step for transmitting a signal based on an FDD method, with information of a signal based on a TDD method being included in the signal based on the FDD method; and
a TDD transmission step for transmitting the signal based on the TDD method,
wherein the signal based on the TDD method includes a signal of a common control channel and a signal of a communication channel,
the information of the signal based on the TDD method includes information of the common control channel, and
the signal of the common control channel includes information of the communication channel.

14. The communication method as claimed in claim 13, wherein the information of the common control channel includes information relating to at least one of a code, a frequency and a timing of the common control channel.

15. A communication method comprising:
an FDD transmission step for transmitting a signal based on an FDD method, with information of a signal based on a TDD method being included in the signal based on the FDD method; and
a TDD transmission step for transmitting the signal based on the TDD method, wherein
the signal based on the TDD method includes a signal of a communication channel, and
the information of the signal based on the TDD method includes at least one of information relating to a position of the signal of the communication channel within a frame of the signal based on the TDD method and information relating to a timing offset between the signal based on the TDD method and the signal based on the FDD method.

16. A mobile station comprising:
FDD reception means for receiving a signal based on an FDD method;
first acquisition means for acquiring information of a signal based on a TDD method from the received signal based on the FDD method; and
first TDD reception means for receiving the signal based on the TDD method on the basis of the acquired information of the signal based on the TDD method, wherein
the first acquisition means acquires information of a synchronization channel based on the TDD method from the received signal based on the FDD method,
the first TDD reception means receives the synchronization channel on the basis of the acquired information of the synchronization channel, and
the mobile station further comprises:
second acquisition means for acquiring information of a code of a common control channel based on the TDD method from the received synchronization channel;
identification means for identifying the code of the common control channel on the basis of the acquired information of the code of the common control channel;
second TDD reception means for receiving the common control channel on the basis of the identified code of the common control channel;
third acquisition means for acquiring a code of a communication channel based on the TDD method from the received common control channel; and
third TDD reception means for receiving the communication channel on the basis of the acquired code of the communication channel.

17. A mobile station comprising:
FDD reception means for receiving a signal based on an FDD method;
first acquisition means for acquiring information of a signal based on a TDD method from the received signal based on the FDD method; and
first TDD reception means for receiving the signal based on the TDD method on the basis of the acquired information of the signal based on the TDD method, wherein
the first acquisition means acquires information of a common control channel based on the TDD method from the received signal based on the FDD method,
the first TDD reception means receives the common control channel on the basis of the acquired information of the common control channel, and
the mobile station further comprises:
second acquisition means for acquiring a code of a communication channel based on the TDD method from the received common control channel; and
second TDD reception means for receiving the communication channel on the basis of the acquired code of the communication channel.

18. A mobile station comprising:
FDD reception means for receiving a signal based on an FDD method;
first acquisition means for acquiring information of a signal based on a TDD method from the received signal based on the FDD method; and
first TDD reception means for receiving the signal based on the TDD method on the basis of the acquired information of the signal based on the TDD method,
wherein the first acquisition means acquires information of a communication channel based on the TDD method from the received signal based on the FDD method,
the first TDD reception means receives the communication channel on the basis of the acquired information of the communication channel, and
the information of the communication channel includes at least one of information relating to a position of a signal of the communication channel within a frame of the signal based on the TDD method and information relating to a timing offset between the signal based on the TDD method and the signal based on the FDD method.

19. A base station comprising:
FDD transmission means for transmitting a signal based on an FDD method;
TDD transmission means for transmitting a signal based on a TDD method; and
means for including information of the signal based on the TDD method in the signal based on the FDD method,
wherein the signal based on the TDD method includes a signal of a synchronization channel, a signal of a common control channel and a signal of a communication channel,
the information of the signal based on the TDD method includes information of the synchronization channel,
the signal of the synchronization channel is a signal for identifying a code of the common control channel, and
the signal of the common control channel includes information of the communication channel.

20. A base station comprising:
FDD transmission means for transmitting a signal based on an FDD method;
TDD transmission means for transmitting a signal based on a TDD method; and
means for including information of the signal based on the TDD method in the signal based on the FDD method,
wherein the signal based on the TDD method includes a signal of a common control channel and a signal of a communication channel,
the information of the signal based on the TDD method includes information of the common control channel, and
the signal of the common control channel includes information of the communication channel.

21. A base station comprising:
FDD transmission means for transmitting a signal based on an FDD method;

TDD transmission means for transmitting a signal based on a TDD method; and means for including information of the signal based on the TDD method in the signal based on the FDD method, wherein the signal based on the TDD method includes a signal of a communication channel, and the information of the signal based on the TDD method includes at least one of information relating to a position of the signal of the communication channel within a frame of the signal based on the TDD method and information relating to a timing offset between the signal based on the TDD method and the signal based on the FDD method.

22. The communication method as claimed in claim 15, wherein the information of the signal based on the TDD method includes information relating to a position of the signal of the communication channel within a frame of the signal based on the TDD method.

23. The communication method as claimed in claim 15, wherein the information of the signal based on the TDD method includes information relating to a timing offset between the signal based on the TDD method and the signal based on the FDD method.

24. The base station as claimed in claim 21, wherein the information of the signal based on the TDD method includes information relating to a position of the signal of the communication channel within a frame of the signal based on the TDD method.

25. The base station as claimed in claim 21, wherein the information of the signal based on the TDD method includes information relating to a timing offset between the signal based on the TDD method and the signal based on the FDD method.

* * * * *